United States Patent [19]

Way et al.

[11] 4,430,588

[45] Feb. 7, 1984

[54] MHD ELECTRODE AND WALL CONSTRUCTIONS

[75] Inventors: Stewart Way, Columbia, Md.; Joseph Lempert, Penn Hills, Pa.

[73] Assignee: The United States of America as represented by the United States Department of Energy, Washington, D.C.

[21] Appl. No.: 921,021

[22] Filed: Jun. 30, 1978

[51] Int. Cl.³ .................................................. H02K 45/00
[52] U.S. Cl. .................................................... 310/11
[58] Field of Search ......................................... 310/11

[56] References Cited

U.S. PATENT DOCUMENTS

| | | | |
|---|---|---|---|
| 3,428,834 | 2/1969 | Yerouchalmi | 310/11 |
| 3,475,627 | 10/1969 | Richez et al. | 310/11 |
| 3,479,538 | 11/1969 | Yerouchalmi | 310/11 |
| 3,487,256 | 12/1969 | Du Bois et al. | 310/116 |
| 3,488,540 | 1/1970 | Du Bois | 310/116 |
| 3,508,087 | 4/1970 | Millet et al. | 310/11 |

*Primary Examiner*—Donovan F. Duggan
*Attorney, Agent, or Firm*—Edward L. Levine

[57] ABSTRACT

Electrode and wall constructions for the walls of a channel transmitting the hot plasma in a magnetohydrodynamic generator. The electrodes and walls are made of a plurality of similar modules which are spaced from one another along the channel. The electrodes can be metallic or ceramic, and each module includes one or more electrodes which are exposed to the plasma and a metallic cooling bar which is spaced from the plasma and which has passages through which a cooling fluid flows to remove heat transmitted from the electrode to the cooling bar. Each electrode module is spaced from and electrically insulated from each adjacent module while interconnected by the cooling fluid which serially flows among selected modules. A wall module includes an electrically insulating ceramic body exposed to the plasma and affixed, preferably by mechanical clips or by brazing, to a metallic cooling bar spaced from the plasma and having cooling fluid passages. Each wall module is, similar to the electrode modules, electrically insulated from the adjacent modules and serially interconnected to other modules by the cooling fluid.

2 Claims, 7 Drawing Figures

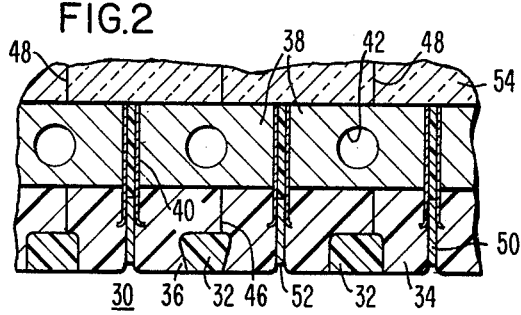
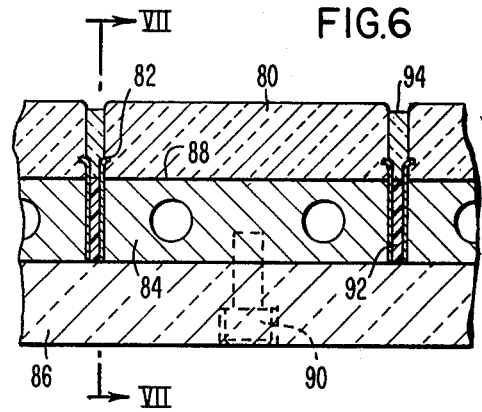
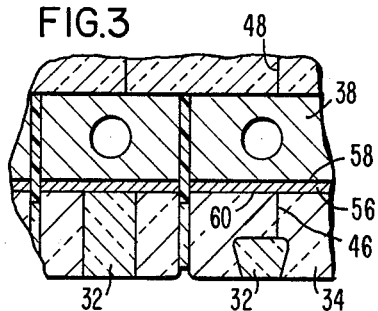
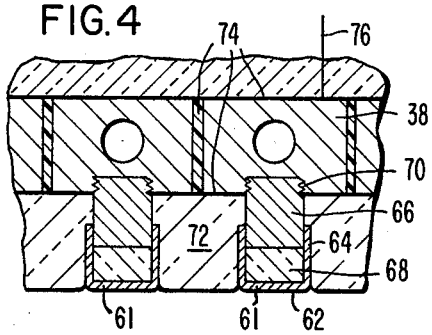
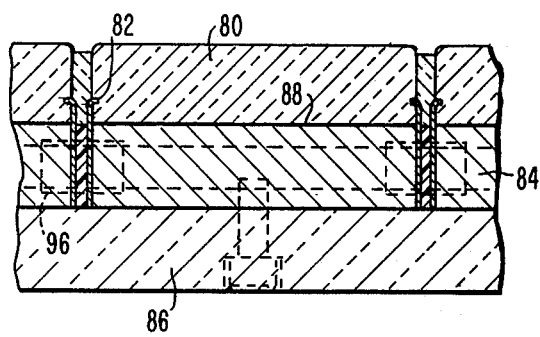
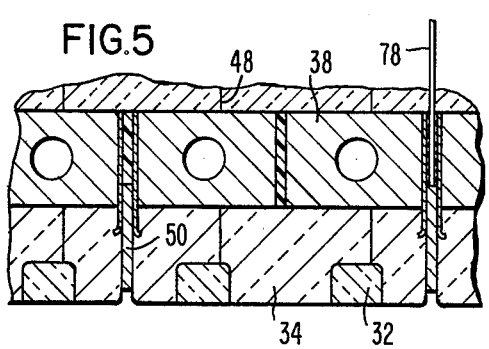

MHD ELECTRODE AND WALL CONSTRUCTIONS

GOVERNMENT CONTRACT

This invention was made or conceived in the course of, or under, a contract with the U.S. Department of Energy, identified as No. E(49-18)-2248.

BACKGROUND OF THE INVENTION

1. Field of the Invention

This invention relates to magnetohydrodynamic (MHD) apparatus, and more particularly provides arrangements for electrodes and walls in the plasma transmitting generator channel.

2. Description of the Prior Art

In MHD generators for large scale power generation, it is important for overall plant efficiency to keep the heat loss to the walls low, preferably less than one-half megawatt per square meter. If such losses exceed about one megawatt per square meter, the adverse effects on overall plant efficiency considerably diminish the attractive features of an MHD process. In order to reduce the wall heat losses, it is important to operate the MHD generator channel with hot walls, for example, walls with the channel internal surfaces running at an average temperature over 1600° C.

Operation with hot walls provides other advantages, including the ability to run the generator walls cleaner and more free from seed and slag deposits, as compared to cold wall operation. Additionally, where hot walls are utilized, current collection to the electrodes tends to take place with the alleviation of arc spots, which spots have been found to occur in cold wall operations, thereby damaging the electrodes and supporting structures. Further, operation with hot walls reduces the cooling requirements for wall elements. Additionally, in order to further alleviate arcing and detrimental Hall effects, when cool walls are used, it is desirable to break up the electrodes into a large plurality of small electrodes, as opposed to larger electrode configurations.

It is therefore desirable to provide wall and electrode constructions for MHD generators which allow operation with hot wall surfaces and which further alleviate Hall effects and detrimental arcing and seed and slag deposits.

SUMMARY OF THE INVENTION

This invention provides electrode and wall constructions for a plasma transmitting channel in an MHD generator which allows operation as a hot wall and which alleviates the above-mentioned deficiencies. The electrode construction includes a plurality of modules which can be made relatively small and which are electrically insulated from adjacent modules, but for cooling purposes are connected in series by a cooling fluid. One type of module includes a ceramic electrode exposed to the plasma and mounted in a ceramic holder. The ceramic holder is affixed to a copper cooling block by a brazed or mechanical connection, and the cooling block has a passage for receiving and discharging cooling water. An electrical lead, preferably of platinum, connects the electrode to, for example, the copper cooling block. Each module is electrically insulated from its adjacent module by a combination of ceramic spacers and a silastic or equivalent sealer provided in the space between adjacent modules. In addition to providing electrical insulation, the spacers and sealers provide additional support to each module. The copper cooling block is affixed to a fiberglass channel wall, and electrical leads are provided between the module electrode and, for example, an electrical terminal board external to the generator channel.

Another configuration utilizes a metallic channel-shaped electrode having an outer surface exposed to the plasma. The legs of the channel are connected, such as by brazing, to a copper mounting bar, which is in turn mechanically affixed to a copper cooling block having a coolant passage therethrough. An internal portion of the electrode is also provided with a ceramic filler. An L-shaped electrode can also be advantageously utilized. Adjacent modules are separated by silicone sealant and ceramic spacers. Since there is a direct, electrically conducting flow path from the electrode through the mounting bar and to the copper block, electrical leads need merely be taken from the copper block to the terminal board or other desired circuitry. The ceramic spacers for either electrode type can be substantially impervious or can be porous with a gas flowing through the spacer and into the plasma containing channel in order to resist build-up of a film or layer of seed and slag between and within the module structures.

An electrically insulating hot wall can also be constructed similar to the modular electrode construction. Here, a module consists of a ceramic body affixed, preferably by mechanical clips or a braze seal directly to a copper cooling block having cooling passages therethrough. Each module is electrically insulated from adjacent modules by a combination of ceramic spacers and silicone adhesives, the spacers preferably extending between the ceramic bodies and the silicone adhesive extending between the cooling blocks.

BRIEF DESCRIPTION OF THE DRAWINGS

The advantages, nature and additional features of the invention will be better understood from the following description, taken in connection with the accompanying drawings, in which:

FIGS. 2 through 5 are cross-sectional views of alternative embodiments of electrode constructions in accordance with the invention;

FIG. 6 is a cross-sectional view of a wall construction in accordance with the invention; and FIG. 7 is a sectional view taken at VII—VII of FIG. 6.

DESCRIPTION OF THE PREFERRED EMBODIMENTS

Figure 1:
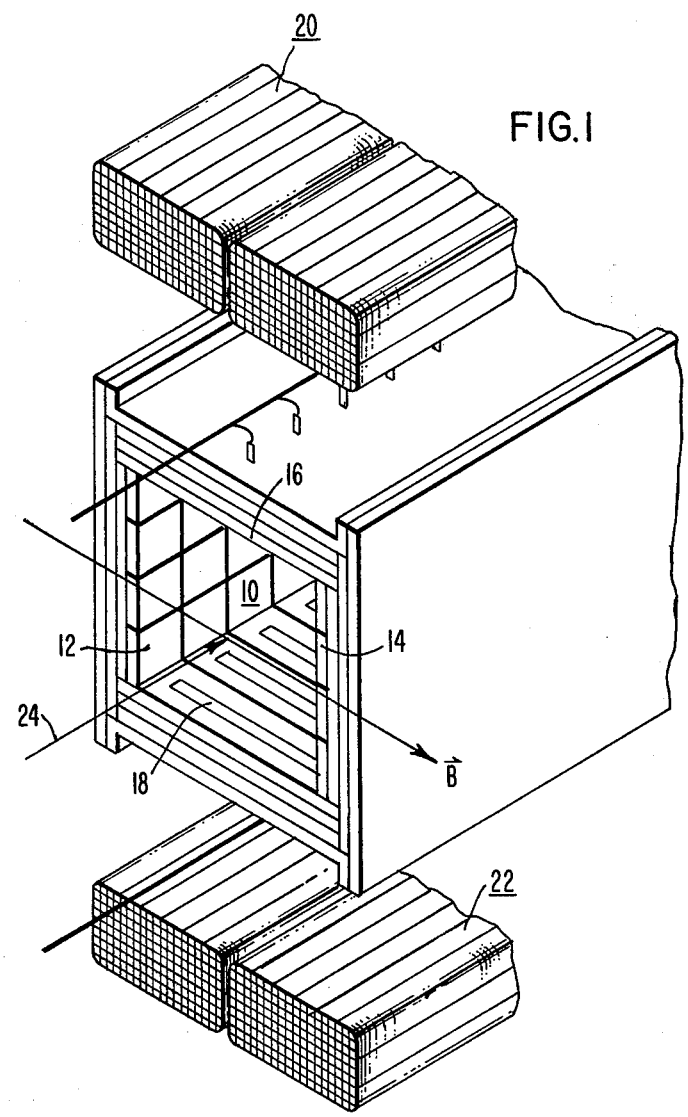
FIG. 1 is a perspective view of a hot plasma-transmitting channel in accordance with the invention.

Referring now to FIG. 1, there is shown a magnetohydrodynamic (MHD) generator channel 10 having two hot insulation walls 12, 14 and two hot electrode walls 16, 18. The walls are comprised of a plurality of modules as described hereafter. Also shown schematically are portions of exciting magnetic coils 20, 22 which create a magnetic field B substantially parallel to the hot electrode walls 16, 18. A hot seeded gas stream, represented by the arrow 24, passes through the channel 10 so that the plasma interacts with the magnetic field generating electrical power.

This invention addresses primarily modular constructions for the walls of the channel 10. It will be understood that while the channel illustrated in FIG. 1 is shown as rectangular, other configurations for the channel and the individual modules are equally possible, particularly where it is desired to specifically orient portions of the channel in a specific geometric relation to the magnetic flux. FIGS. 2 through 5 show alternative embodiments of electrode configurations which, in the cross-sections shown, measure approximately 1 inch×1 inch. The electrode module 30 shown in FIG. 2 includes a ceramic electrode 32, such as one comprised of yttria stabilized zirconia or other ceramics which are conductive at the electrode operating temperatures, such as calcia or magnesia stabilized zirconia, doped lanthanum chromite, strontium zirconate with titania addition, or other conductive and refractory materials. The electrode is fixedly mounted to an electrically insulating ceramic holder 34, preferably impervious to penetration by the high temperature seed and slag present in the plasma. The electrode 32 can be affixed to the holder 34 by an adhesive, such as a zirconia cement, by brazing with Ticusil (Ag—CU,eutectic with 4% Ti) solder, or, in a somewhat lower temperature environment, a silver filled epoxy, and can additionally be supported by matching geometric configurations, such as the dovetail 36. The ceramic holder is fixedly mounted to a metallic, such as copper, cooling block 38 by attaching means such as the mechanical clips 40. A thin layer of high temperature sealant or adhesive can also be used. The cooling block includes a passage 42 for circulation of a coolant fluid, such as demineralized water or nitrogen gas. Copper is a preferred cooling block material because of its good thermal and electrical conductivity characteristics, as well as its relatively low cost.

Each module 30 also includes means for conducting a current from the electrode to the cooling block and to desired electrical circuitry, such as a terminal board external to the generator channel, direct current inverter apparatus, and the ultimate load, or other circuitry well known in the art. This electrical conduction means can include one or more platinum wires 46 connecting the electrode 32 and cooling block 38. It can further include a lead 48 from the cooling block to the circuitry. It will be noted that dependent upon the temperature distribution, the geometry of electrode 32 and holder 34 can be modified to lengthen or shorten the heat flow path. The electrode and holder can further be attached by means such as a platinum braze. One method for making reliable high temperature joints is to fire a platinum mesh onto, for example, the back of the ceramic electrode through use of a platinum paste. The platinum lead can then be welded to the mesh. Similar connections can be made to, for example, the copper cooling blocks. The platinum lead can also be soldered or brazed directly to the copper block.

Each module is insulated electrically from adjacent modules by insulating means, such as the ceramic spacers 50. The copper cooling blocks, which operate at a much lower temperature, on the order of below 280° C., can be effectively insulated by silicone or silastic sealants. The sealant used should be compatible with the operating temperature environment without degradation of its sealing and joining characteristics, and more specifically should retain capability to keep the combustion products, gases, and seed and slag from penetrating to the sealed components. As discussed further below, the ceramic spacers can include various materials, although preferably nonporous material, or material with closed porosity or with a sealed impervious surface 52, are preferred. Materials such as magnesium oxide (MgO) or magnesium aluminate (MgAl$_2$O$_4$) are preferred candidate materials for the holders 34. Spacer 50 can be a high grade alumina. The criteria to be met is that the spacers 50 be resistive to alkali seed impregnation and provide substantial electrical insulation at the high operational temperature. The outer surface of the spacer exposed to the plasma should operate at a temperature of at least 1300° C. to avoid seed condensation and build-up of a detrimental film. It will be noted that in addition to providing electrical insulation among adjacent modules, the ceramic and silastic sealants also provide substantial lateral support for the overall modular electrode assembly.

While the individual modules 30 are electrically insulated from one another, they are integrated by the cooling fluid, such as water or a pressurized gas, for example, helium or nitrogen which flows through the passages 42 in a predetermined path from one module to another. It will be readily apparent that the cooling fluid must be substantially electrically resistive, and demineralized water is preferred for this purpose.

The outer wall 54 of the channel to which the electrodes are affixed can comprise several materials, although fiberglass has typically been utilized, most recently attention being focussed on NEMA designation G-7. The attachement can be by mechanical or other means and preferably includes a layer of silastic. Alternatively, the fiberglass wall can include an inner lining of a metallic generator wall structure.

Additional means for attachment of the holder 34 to the cooling block 38 is shown in FIG. 3. Here, a metal plate 56, such as copper, is inserted between the holder 34 and cooling block 38. The plate 56 is soldered 58 to the cooling block, and is brazed 60 or welded to the holder by use of platinum mesh and paste or other brazing means appropriate for the application.

FIG. 4 illustrates an embodiment including metallic electrodes 61. The electrodes are preferably channel or U-shaped, with an outer surface 62 exposed to the plasma. The legs 64 of the channel are affixed to a metallic mounting bar 66 by means such as brazing. The preferred material of the metallic electrode comprises platinum or platinum and rhodium alloys, and the mounting block can be of a refractory Inconel alloy. Additionally, a ceramic filler 68, for example MgO, is disposed within the electrode 61 to establish the desired operating temperature of the electrode surface. The mounting bar 66 is attached to the cooling block 38 by mechanical means such as the threaded connection 70. Each module is, similar to the embodiments discussed above, electrically insulated from adjacent modules by a combination of ceramic spacers 72 and silicone sealant 74. Since a direct electrical connection exists between the metallic electrode, mounting bar and copper block, a lead 76 need only be provided from the block 38 to the desired electrical connection. In order to maintain an acceptable temperature at the electrode-plasma interface, the thickness of the legs 64 of the electrode is adjusted to achieve the desired heat transfer flow path while maintaining acceptable electrical conductivity. It will be noted that similar constructions can be envisaged, such as the use of an L-shaped electrode in place of the illustrated U-shaped electrode 60, merely by eliminating one leg of the channel. In accordance with principles well known in the art relating to current concentrations, an L-shaped electrode would preferably have the attaching leg of the L on the downstream side of the plasma for anodes and on the upstream side for cathodes. However, since there are several phenomena induced, experimental evidence may dictate additional orientations for an L-shaped electrode.

It will be apparent that for ease of construction, and consistent with the desired operation of a hot wall with minimal electrical arcing and seed deposition, each module can be constructed with more than one of each of the components, such as dual cooling blocks associated with a singular electrode or dual electrodes associated with a single cooling block. Another alternative, incorporating dual electrodes and cooling blocks in conjunction with a singular holder 34, is shown in FIG. 5. While in the embodiments of FIGS. 2 through 4 the pitch spacing among electrodes is substantially constant, it will be noted that the embodiment of FIG. 5 varies the pitch such that the electrodes in the singular holder are closer than the electrodes between adjacent modules. This results in increased structural strength at the outer portions of the holder. Thus, the embodiment of FIG. 5 allows for an increase in the strength and ruggedness of the holder block 34, as compared to the above-discussed embodiments, rendering the holders less susceptible to cracking under the influence of thermal stresses and any electrical arcing.

Additional variations of the modular construction can be incorporated consistent with the desired purpose of maintaining the seed from entering the spaces between adjacent electrodes. For example, the spacers 50 can be made porous, preferably with aligned and predetermined porosity characteristics, and a hot gas such as clean air injected therethrough and into the plasma through transmission means such as the conduit 78.

Referring now to FIGS. 6 and 7 there is shown a similar hot insulating wall construction such as for incorporation in the walls 12 and 14 of the MHD generator. Here, insulating ceramic bodies 80 are affixed by mechanical clips 82 or other attaching means to metallic, such as copper, cooling blocks 84. Each such module is similarly electrically insulated from adjacent modules, integrated by a cooling fluid, and affixed to the fiberglass channel wall or mounting panel 86. In addition to the metallic clips 82, a thin silicone or other adhesive sealant 88 can also be used for affixing the ceramic body 80 to the cooling block 88. The sealant also serves to prevent entry of condensed seed or moisture. As shown in FIG. 7, the clips and adhesive can be disposed at various locations about the body 80, particularly where the geometric configuration of the body is varied. The module can be affixed to the fiberglass panel 86 by mechanical attaching means, such as the threaded connection 90.

Additional support and electrical insulation among modules is also provided by use of a silicone adhesive 92 and ceramic spacers 94. The spacers function to prevent liquid seed, such as, for example, KOH, $K_2CO_3$, or $K_2SO_4$ from bridging the gap between adjacent clips 82 or cooling blocks 84. The spacers also prevent liquid seed from bridging the gaps between insulating blocks 80. To alleviate any film build-up, the outermost edge of the spacer should operate at a temperature above the condensation point of the seed compounds, typically around 1300° C. It will be noted that a construction which maintains a sufficiently high temperature can also be envisioned without the use of spacers, such as, for example, injecting a hot, clean gas between adjacent modules and into the plasma. Similarly, porous spacers through which hot gases are injected can also be utilized.

Similar to the alternative embodiments discussed above, the ceramic blocks 80 can also be affixed to the cooling blocks 84 through the use of a separate metal plate brazed to the ceramic body 80 and, for example, mechanically affixed to the cooling block 84. It will also be noted that the ceramic bodies and blocks can be of various geometric configurations, including triangles, parallelograms, trapezoids, or other polygonal figures, in order to have the module outlines more closely conform to the equipotential lines of the plasma electric field within the channel.

The integration of the modules by the cooling fluid flow can be done in many variations well known in the art. One means of connection through use of a sealing joint 96 is shown in FIG. 7. It will be apparent that, in order to maintain electrical insulation among modules, the fluid interconnection means should be electrically non-conducting. It will further be noted that the fluid connecting means can be disposed within the fiberglass wall 86, such as, for example, incorporating passages within the fiberglass matingly configured to the passages in the copper cooling blocks 84.

Alternative modifications are possible without departing from the scope of the invention.

We claim:

1. An electrode construction adapted for use in a wall of an MHD channel in which a plasma flows at an operating temperature, comprising:
    a ceramic holder being approximately one inch by one inch in lateral cross section, said holder being electrically insulating at said operating temperature;
    a ceramic electrode contained within said holder and having a frontal face only exposed to said plasma, said electrode being electrically conductive at said operating temperature;
    a metallic bar mounted to said holder and spaced from said plasma and said electrode;
    means for conducting a current between said electrode and said bar; and
    means for flowing a cooling fluid through said metallic bar.

2. An electrode construction adapted for use in a wall of an MHD channel in which a plasma flows at an operating temperature, comprising:
    a plurality of spaced ceramic holders, said holders being electrically insulating at said operating temperature;
    a plurality of ceramic electrodes, each said electrode contained within a respective one of said holders and having a frontal face only exposed to said plasma, each said electrode being electrically conductive at said operating temperature;
    a plurality of metallic bars, each said bar being in thermal communication with a respective one of said holders and spaced from said plasma and said electrode;
    means for conducting a current between each said electrode and said respective bar;
    means for flowing a substantially non-conductive cooling fluid in contact with preselected cooling bars; and
    means for electrically insulating said spaced holders one from another and for electrically insulating said metallic bars one from another.

* * * * *